United States Patent
Orcutt et al.

(10) Patent No.: US 7,187,483 B1
(45) Date of Patent: Mar. 6, 2007

(54) MAGNET ON FRAME OSCILLATING DEVICE

(75) Inventors: John W. Orcutt, Richardson, TX (US); Andrew Steven Dewa, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/228,894

(22) Filed: Sep. 16, 2005

(51) Int. Cl.
*G02B 26/08* (2006.01)

(52) U.S. Cl. ........................................... 359/224
(58) Field of Classification Search ......... 359/223–226
See application file for complete search history.

(56) References Cited

U.S. PATENT DOCUMENTS 6,803,938 B2 * 10/2004 Turner ..................... 347/237

* cited by examiner

*Primary Examiner*—Euncha P. Cherry
(74) *Attorney, Agent, or Firm*—William B Kempler; W. James Brady; Frederick J. Telecky, Jr.

(57) ABSTRACT

An oscillating torsional hinged device, such as a mirror, having the advantages of an oscillating device with permanent magnets mounted on the hinges, but without excessive size is disclosed. The permanent magnets are mounted in the areas of the anchor members rather than directly on the hinges.

19 Claims, 3 Drawing Sheets

MAGNET ON FRAME OSCILLATING DEVICE

CROSS-REFERENCE TO RELATED APPLICATIONS

This application relates to the following co-pending and commonly assigned patent applications: (TI-60301) Ser. No. 11/228,893 filed herewith, entitled Resonant Oscillating Device Actuator Structure and (TI-60302) Ser. No. 11/229,480 filed herewith, entitled Apparatus And Method For Adjusting The Resonant Frequency Of An Oscillating Device, which applications are hereby incorporated herein by reference.

TECHNICAL FIELD

The present invention relates generally to the field of torsional hinged MEMS (Micro Electro Mechanical Systems) oscillating devices. More particularly, the invention relates to methods and apparatus for providing a pivoting device such as a mirror, which includes a permanent magnet as a part of either the magnetic drive mechanism, a magnetic sensing mechanism, or both, and wherein the magnet(s) is not mounted on the back side of the mirror.

BACKGROUND

The use of rotating polygon scanning mirrors in laser printers to provide a beam sweep or scan of the image of a modulated light source across a photoresisted medium, such as a rotating drum, is well known. More recently, there have been efforts to use a much less expensive flat member with a single reflective surface, such as a resonant oscillating mirror to provide the scanning beam. Further, resonant oscillating members other than mirrors may also be useful. These resonant scanning devices provide excellent performance at a very advantageous cost. However, because a permanent magnet (drive or sensing) is typically mounted on the back side of the resonant member, the center of mass of the magnet and other rotating elements have very close and critical tolerances.

In addition, the critical mass of the device further complicates the task of maintaining the resonant frequency within acceptable tolerances. According to prior art magnetic drive mechanisms for these oscillating devices, a permanent magnet is mounted to the back side of the resonating device, such as the back side of a mirror surface. This permanent magnet interacts with a drive coil located very close to the device. The critical mass balance of the device requires that the permanent magnet be designed with a size, thickness, and mass having very close tolerances. Other resonant torsional hinged device arrangements may use the permanent magnet as a sensing magnet and use an inertia or piezoelectric drive mechanism to maintain the device or mirror oscillating at its resonant frequency.

However, regardless of whether the magnet is used as a sensing magnet or a drive magnet, it causes problems in maintaining the flatness of the device and significantly increases the oscillating mass. Since a primary use of torsional hinged devices is the scanning mirror in laser printers, flatness and a stable resonant frequency is important. One solution to the problems discussed above is to move the permanent magnet from the back of the oscillating device or mirror onto the torsional hinges. Unfortunately, although this solution solves many of the problems discussed above, it also adds length to the device, which of course makes the device larger and more costly.

Therefore, it would be advantageous to provide an inexpensive and easily manufactured mirror structure that has the advantages of a system wherein the magnets are mounted on the torsional hinges but does not require the extra length of such a structure.

SUMMARY OF THE INVENTION

These and other problems are generally solved or circumvented, and technical advantages are generally achieved, by embodiments of the present invention, which provides a torsional hinged pivoting device such as a mirror with a magnetic drive mechanism.

The torsional hinged device comprises a pair of torsional hinges where each hinge of the pair of hinges extends along a pivot axis from a first end to a second end. An oscillating surface, such as a mirror, is located between and connected to the first end of each one of the pair of torsional hinges. First and second anchor members include a support structure portion mounted to a support structure, a central portion lying along the pivot axis and connecting regions having a reduced cross-sectional area connecting the support portion to the central portion. The central portion of each anchor member is connected to the second end of a torsional hinge.

An enlarged mounting area lies along the pivot axis and is connected to the central portion of the anchor members opposite the connection to the torsional hinge. The connecting regions having the reduced cross-sectional areas may have a thickness that is less than the thickness of the central portion. Alternately, the reduced cross-sectional areas may be formed by etching trenches completely through the material and extending between the enlarged mounting area and the support portions of the anchor member. The reduced cross-sectional area results in the mounting area being rigidly connected to the torsional hinges and flexibility connected to the anchor support portions on either side of the hinge axis. A permanent magnet or a ferromagnetic high permeability material may be attached to the mounting area(s). If the device includes mounting areas and magnets proximate both anchors, both magnets can be used as drive magnets, or one magnet can be a drive magnet and the other could be used as a position sensing magnet. Alternately, the structure may include a sensing magnet attached to the mounting area and a piezoelectric drive elements attached to the support portions of the anchors.

There is also provided a coil comprising a multiplicity of electrical windings mounted proximate each of the mounting areas where a magnet is mounted. If the magnet is to provide a driving force to oscillate the device, an alternating electric current provided from a power source flows through the multiplicity of winding and creates a magnetic force that interacts with the permanent magnet to pivot the mirror member about the torsional hinge. If the magnet is to operate as a sensing magnet, the magnetic flux created by the permanent magnet on the oscillating structure will move past the electrical coil and will induce a voltage in the coil that is representative of the angular motion or position of the oscillating device or mirror. The voltage induced in the coil can be monitored to track the angular movement of the mirror.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 4:
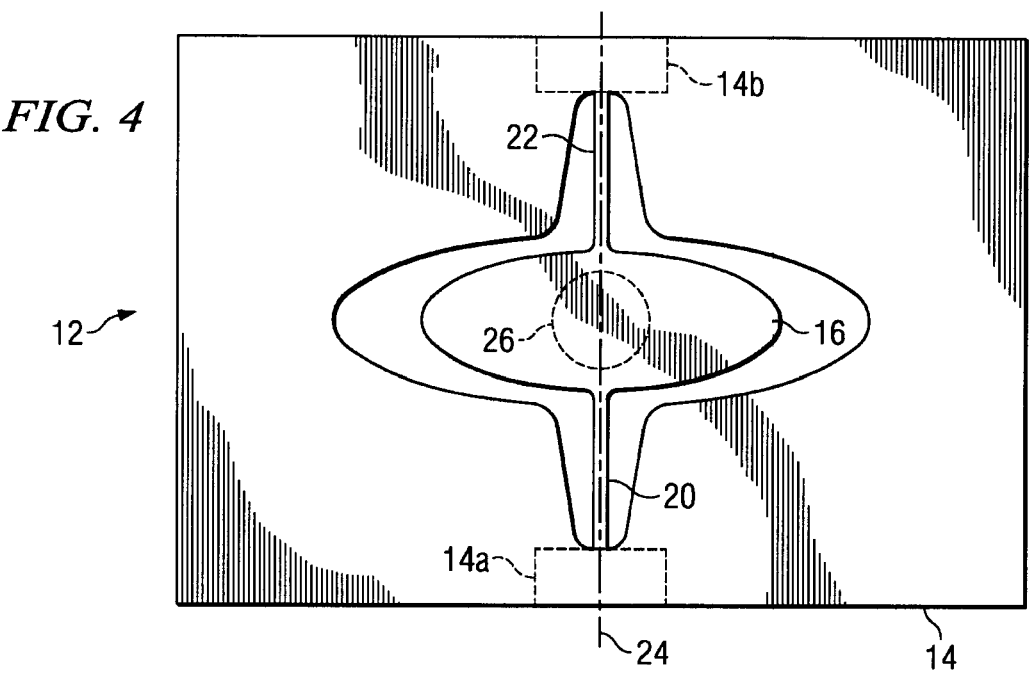
FIG. 4 is a perspective view of a prior art torsional hinged device, wherein a magnet is mounted to the back side of the device.

Referring now to FIG. 4, there is shown a prior art device or mirror 12 using torsional hinges. As shown in FIG. 4, the mirror device 12 includes an anchor such as frame 14 and an operating portion or 16. Operating portion 16 may be any selected device, including but not limited to mirrors, optical gratings, etc. The operating portion 16 illustrated in FIG. 4 is a mirror having reflective surface 18 for reflecting light, and is supported by a pair of torsional hinges 20 and 22 that extend from the operating portion or device 16 to the anchor or frame 14. In the embodiment of FIG. 4, the anchor is illustrated as a frame 14, however, it will be appreciated that instead of a complete frame around the device 16, the anchor 14 may simply include a pair of anchor pads 14a and 14b as indicated by dotted lines.

A drive mechanism applies torque to the operating surface of the device or mirror so that the device 16 such as mirror surface 18 will pivot or oscillate (preferably at a resonant frequency) about the torsional hinges 20 and 22. The pivot axis or selected axis 24 lies along the torsional hinges 20 and 22. As an example, the drive mechanism is illustrated as a permanent magnet 26 bonded to the back side of the operating portion or device 16. Permanent magnet 26 interacts with magnetic forces created by coils or windings located proximate the permanent magnet.

In the embodiment shown in FIG. 4, frame 14 or the anchor pads 14a and 14b are mounted to a support structure (not shown).

Figure 5:
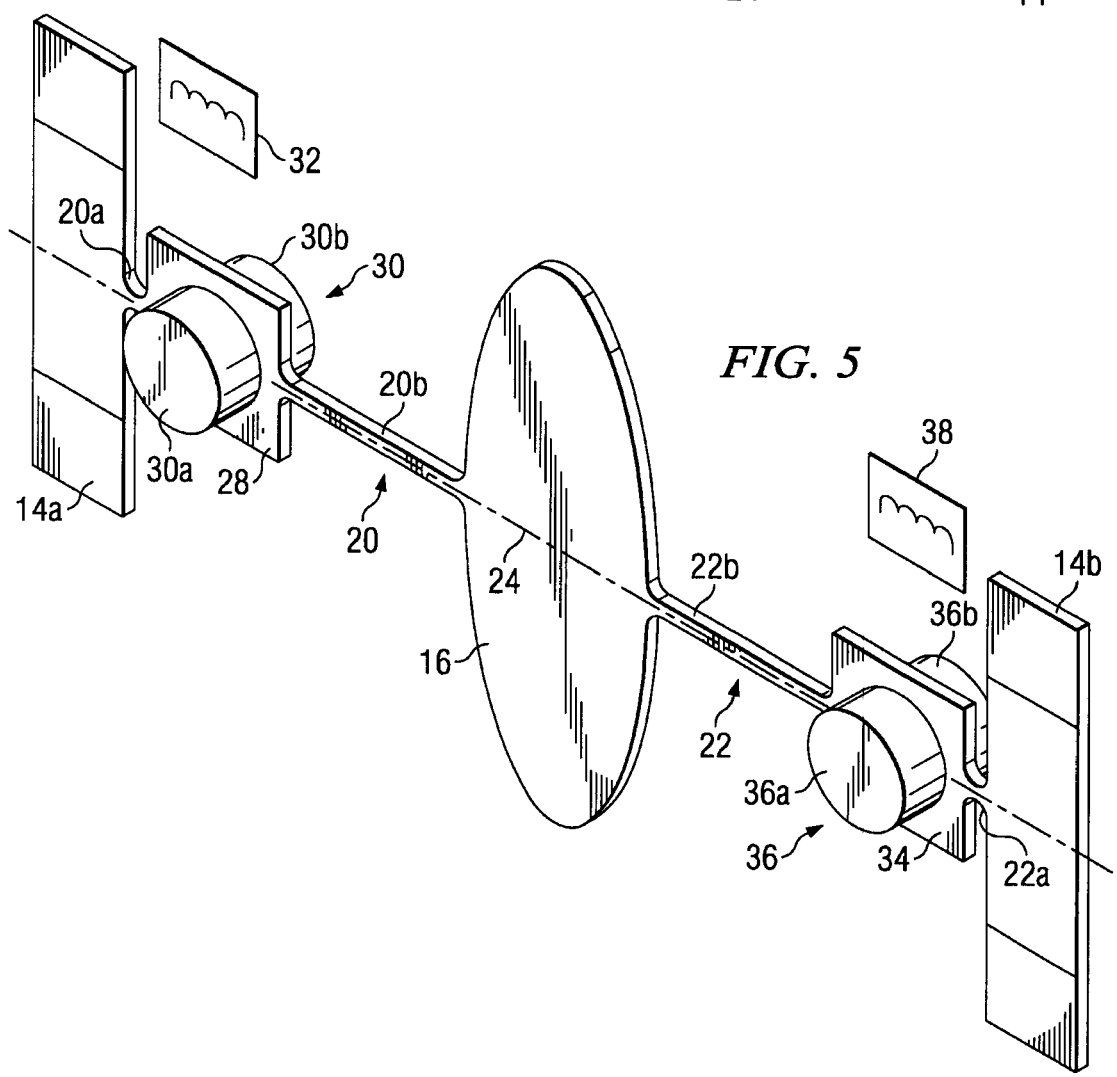
FIG. 5 is a perspective view of a torsional hinged device, wherein a magnet is mounted to the mounting areas on the hinge.

Referring now to FIG. 5, there is shown an example of a presently available single layer torsional hinged device 16 that includes enlarged mounting areas on each of the torsional hinges. Those components and elements of the device illustrated in FIG. 5 that are common to the structure of FIG. 4 will carry the same reference numbers as in the previously discussed prior art FIG. 4. As shown in FIG. 5, there is an elongated ellipse shaped portion 16, such as a mirror, supported by a first torsional hinged 20 having a first portion 20a and a second portion 20b separated by an enlarged mounting area 28. As shown, one end of the torsional hinged portion 20a is attached to anchor member 14a and the other end is attached to the enlarged mounting area 28. One end of torsional hinged portion 20b is attached to the enlarged mounting area 28 and the other end is attached to the operating portion or mirror 16. In addition, the structure of FIG. 5 includes a permanent magnet 30 attached to mounting area 28 that interacts with a winding or coil 32. In a similar manner, a second torsional hinge 22 also includes first and second hinge portions 22a and 22b, another enlarged mounting area 34, and another permanent magnet 36. There is also included a coil 38 located proximate the permanent magnet 36.

It should also be noted that in the illustration of FIG. 5, each of the magnets 30 and 36 are comprised of first magnet portions 30a and 36a on one surface of enlarged areas 28 and 34 and second magnet portions 30b and 36b on the opposite surface of enlarged areas 28 and 34 respectively. However, it will be appreciated by those skilled in the art that one of the top or bottom portions of the magnets 30 and 36 mounted on enlarged areas 28 and 34 can be eliminated and only one portion of the magnets 30a and 36a used.

In the embodiment in FIG. 5, both the combination of permanent magnet 30 and coil 32 and the combination of permanent magnet 36 and coil 38 may be used to drive the oscillations of operating surface or mirror 16. More specifically, if a drive signal having a frequency substantially the same as the resonant frequency of the device 16 is applied across the coils 32 and/or 38, device 16 should pivot back and forth around pivot axis 24 at its resonant frequency, as a result of the interaction of the torque applied by the coils 32 and 38 to the permanent magnets 30 and 36.

Alternately, the drive signal can be applied across only one of the two coils or windings to cause the mirror to pivot at resonance. If only one coil and permanent magnet combination is used to drive and maintain the mirror oscillating at its resonant frequency, the other coil and permanent magnet combination may be used to monitor the angular position or movement of the oscillating mirror. As will be appreciated by those skilled in the art, the changing magnetic flux of the moving or oscillating permanent magnets (either 30 or 36) intersecting an adjacent coil 32 and 38 will induce an alternating voltage representative of the angular position of the oscillating device 16. By monitoring this changing voltage, the angular position of the oscillating mirror is known or can be determined.

The device of the structure of FIG. 5 also illustrates that the drive magnets may be moved from the back side of the operating surface or mirror (as shown in FIG. 4) to the hinge area. This change significantly reduces the rotational inertia and the hinge stress and allows a greater radius or curvature on the pivoting device 16 since the magnet does not go through the full angular motion that is traveled by the operating device 16, such as for example the mirror surface 18. Therefore, the resulting device is stronger and more robust. This approach solves many of the problems associated with the mirror structure of FIG. 4. Unfortunately, as can be seen, the distance between anchors 14a and 14b is longer than equivalent device or mirror of the type shown in FIG. 4. This increase in size, and the corresponding increase in packaging size adds cost, which distracts from the other advantages of the structure.

Figure 1:
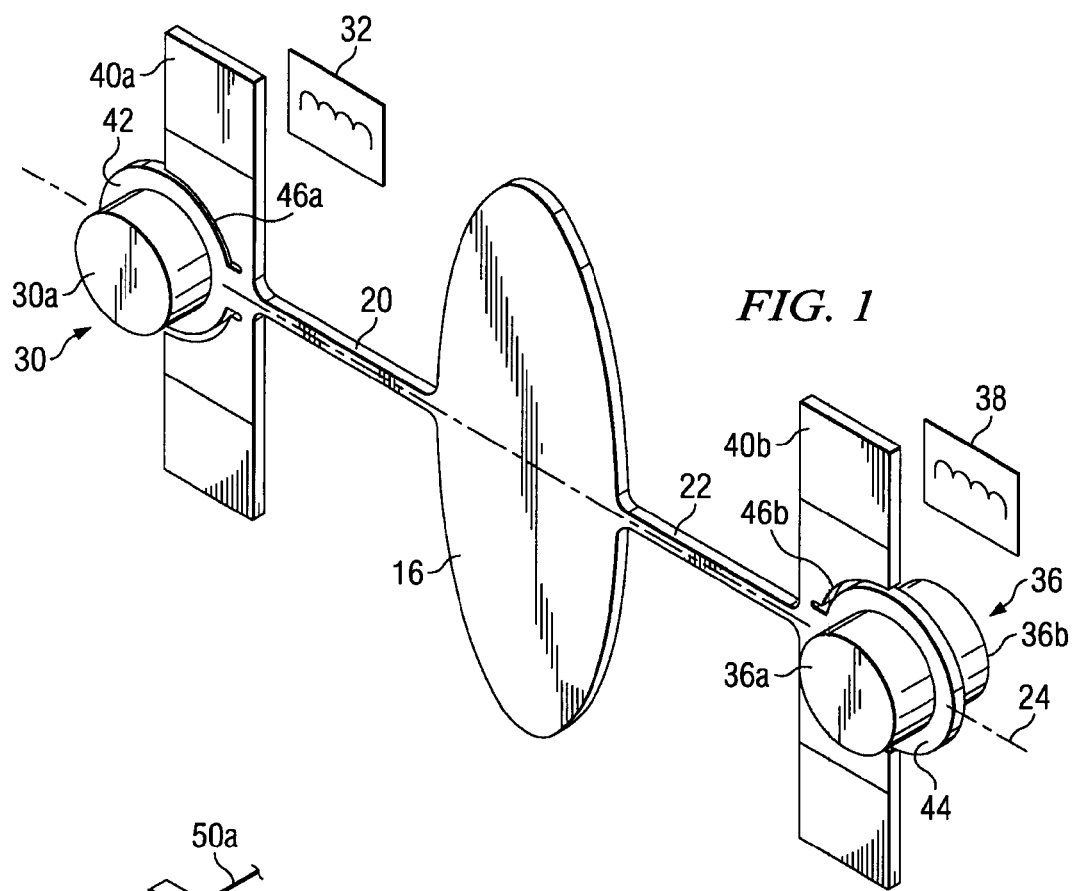
FIG. 1 is a perspective view of a first embodiment of the present invention illustrating a permanent magnet mounted on the mounting area at both anchor members.

Therefore, referring now to FIG. 1, there is illustrated a first embodiment of the present invention that can pivot or oscillate at its resonant frequency and that includes the advantages of the structure of FIG. 5, but is not substantially larger than the structure of FIG. 4. Those elements of the device of FIG. 1 that are the same as, and operate the same as the elements of the structures of FIGS. 4 and 5 carry the same reference numbers.

As shown, the structure of FIG. 1 includes several of the elements of FIGS. 4 and 5 including a frame and/or anchor members 40a and 40b, the operating surface or mirror 16, and torsional hinges 20 and 22. However, the torsional hinges 20 and 22 do not include the enlarged mounting areas 28 and 34, but instead extend directly between the operating device 16 and the anchors 40a and 40b. In addition, enlarged mounting areas 42 and 44 are attached to anchors 40a and 40b opposite hinges 20 and 22. In the embodiment illustrated in FIG. 1, anchors 40a and 40b include a central portion that is attached to the torsional hinges. Support portions on each side of the hinges are connected together by a region having a reduced cross-sectional area. The reduced area of FIG. 1 is defined by trenches 46a and 46b that separate the enlarged areas 42 and 44 from the anchor members. As is also illustrated in FIG. 1, trenches 46a and 46b are etched completely through the material of anchors 40a and 40b. Permanent magnets 30 and 36 are mounted to the enlarged areas 42 and 44 in a manner similar to the structure of FIG. 2. Also as discussed above, permanent magnets 30 and 36 interact with coils 32 and 38 to provide torque to the mirror and/or to monitor the angular position of the operating device 16. It should also be appreciated that the permanent magnets could be replaced with a ferromagnetic material such as a nickel/iron alloy since such materials are attracted to a magnetic field. The ferromagnetic material could be used to either drive the oscillating mirror or to sense the angular position. However, to use the ferromagnetic material to sense angular position will require sending changes in the inductance, rather than a voltage.

Figure 1A:
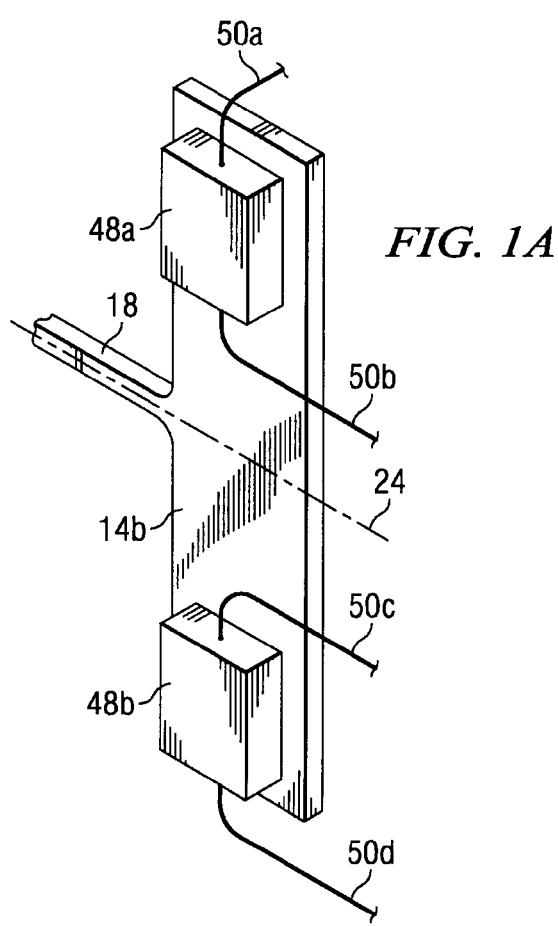
FIG. 1A is a partial perspective view of another embodiment illustrating a piezoelectric element mounted on one of the support anchors.

FIG. 1A is a partial perspective view of another embodiment of the invention wherein piezoelectric elements 48a and 48b, with electrical connections 50a, 50b, 50c, and 50d are attached to at least one of the anchor pads (e.g. anchor pad 14b) for providing oscillations to the device 16.

Figure 2:
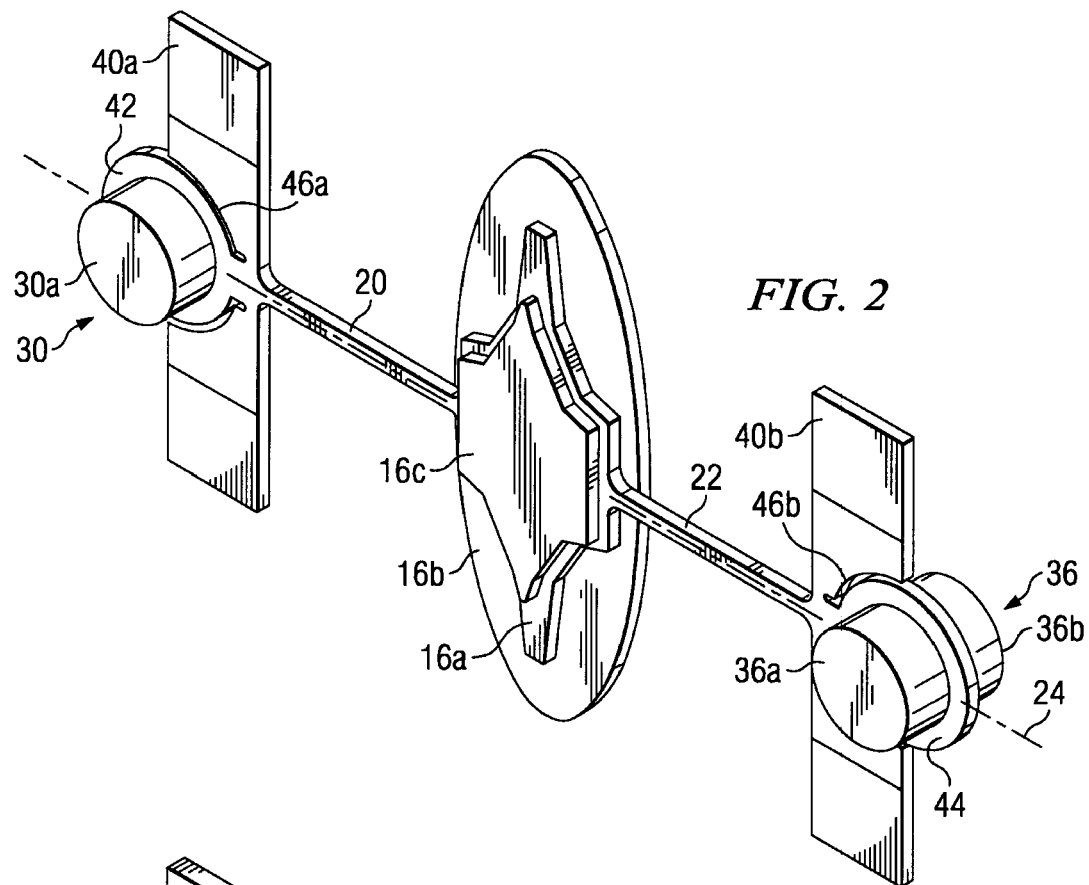
FIG. 2 is another embodiment of the present invention similar to FIG. 1, but shows a multilayer oscillating structure.
Figure 3:
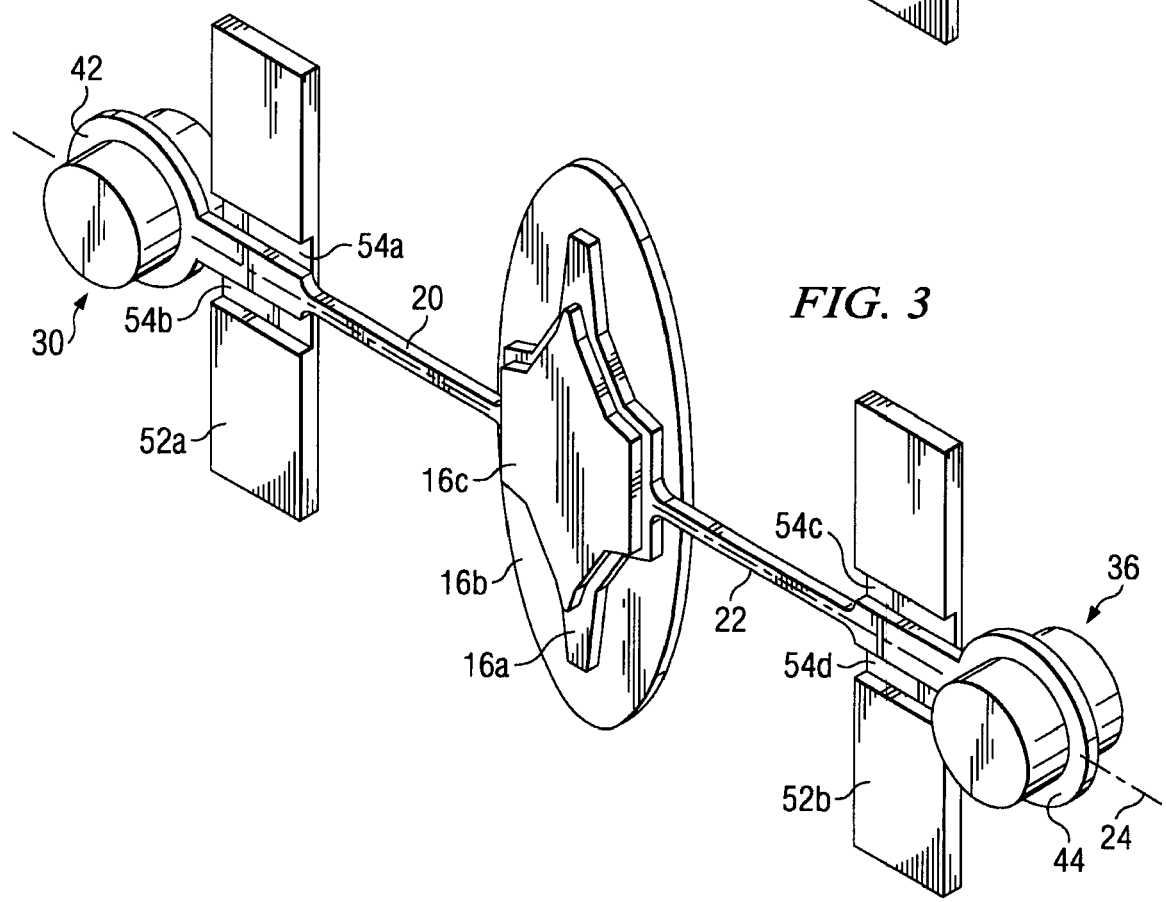
FIG. 3 is yet another embodiment of the invention similar to FIG. 2 but illustrates a different method of attaching an enlarged mounting area to the support anchors.

If a piezoelectric element is used as the drive source at only one anchor pad and torsional hinge (e.g. 14b and 18), a magnet arrangement such as shown in FIGS. 1–3 may be used with the anchor pad 14a and the torsional hinge 20 at the other side (e.g. 20), to monitor the angular position of the device. Alternately, the device may be driven according to the teaching of this invention with a magnet arrangement as discussed above, and the piezoelectric element arrangement of FIG. 1A may be used to monitor the angular position of the device.

FIG. 2 is similar to FIG. 1 and those elements of FIG. 2 that are common to FIG. 1 carry the same reference number. However, instead of a single layer mirror structure, FIG. 2 illustrates that the oscillating mirror portion of the structure may be multilayered. As shown, there is a hinge layer that includes the torsional hinges 20 and 22, and a truss portion 16a. A reflective surface layer 16b is attached to one side of the truss structure 16a and a balancing layer 16c is attached to the other surface of truss structure 16a. Balancing layer 16c is designed to balance the mass of reflective portion surface layer 16b so that the center of mass lies along the axis 24. It will also be appreciated by those skilled in the art that all three layers 16a, 16b, 16c could be separate structures bonded together, or preferably the reflective surface portion 16b and the truss structure 16a could be etched from a single piece of silicon.

FIG. 3 shows a multilayer structure similar to that of FIG. 2, but attaches the enlarged mounting areas 42 and 44 to the outside edge of the central portion of the support anchors 52a and 52b and opposite the torsional hinges 20 and 27 respectively. In addition, to provide flexibility at the point where the torsional hinges 20 and 22 connect to the support structures 52a and 52b, according to this embodiment, the reduced areas connecting to support portions to the central portion are thinned areas 54a, 54b, 54c, and 54d. Thinned areas 54a, 54b, 54c, and 54d are used rather than the trenches 46a and 46b, discussed with respect to FIGS. 1 and 2.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, methods and steps described in the specification. As one of ordinary skill in the art will readily appreciate from the disclosure of the present invention, machines, methods, or steps, presently existing or later to be developed, that perform substantially the same function or achieve substantially the same result as the corresponding embodiments described herein may be utilized according to the present invention. Accordingly, the appended claims are intended to include within their scope such machines, means, methods, or steps.

What is claimed is:

1. An oscillating torsional hinged device comprising:
a pair of torsional hinges, each hinge of said pair of torsional hinges extending along a pivot axis from a first end to a second end;
an oscillating member located between said torsional hinges and connected to said first end of each of said torsional hinges;
first and second anchor members each comprising a support portion mounted to a support structure, a central portion lying along said pivot axis, and reduced areas connecting said support portion to said central portion, said central portion connected to said second end of one hinge of said pair of torsional hinges; and
first and second enlarged mounting areas lying along said pivot axis and connected one each to said central portion of said first and second anchor members opposite said connection to said torsional hinge.

2. The oscillating torsional hinged device of claim 1 further comprising ferromagnetic material or a permanent magnet attached to at least one of said enlarged mounting area.

3. The oscillating torsional hinged device of claim 2, further comprising an electrical coil located proximate said ferromagnetic material or permanent magnet.

4. The oscillating torsional hinged device of claim 3, wherein said oscillations of said oscillating member are provided by magnetic flux produced by said electrical coil interacting with said ferromagnetic material or permanent magnet.

5. The oscillating torsional hinged device of claim 4 further comprising at least one piezoelectric element mounted to the other one of said anchor members for monitoring the angular position of said oscillating member.

6. The oscillating torsional hinged device of claim 3 wherein oscillations of said oscillating member are monitored by measuring the voltage generated as the moving magnetic field of said permanent magnet intersects said electrical coil.

7. The oscillating torsional hinged device of claim 6 wherein said oscillations are provided by a piezoelectric element mounted to the other one of said anchor members.

8. The oscillating torsional hinged device of claim 2 wherein said enlarged mounting area has a top side and a bottom side, and a portion of said permanent magnet is mounted on both said top and bottom sides of said enlarged mounting areas.

9. The oscillating torsional hinged device of claim 3 comprising two electrical coils, two enlarged mounting areas connected one each to said first and second anchor member and each enlarged area having a permanent magnet attached thereto.

10. The oscillating torsional hinged device of claim 9 wherein said oscillations of said oscillating member are generated by interaction of one of said permanent magnets with one of said electrical coils, and wherein said oscillations of said oscillating member are monitored by the interaction of the other one of said permanent magnets interacting with the other one of said electrical coils.

11. The oscillating torsional hinged device of claim 9 wherein said oscillating of said oscillating member generated by the interaction of both permanent magnets with a corresponding electrical coil, and further comprising another permanent magnet mounted to said oscillating member and an electrical coil located proximate said another permanent magnet for monitoring the angular position of said oscillating member.

12. The oscillating torsional hinged device of claim 9 wherein said oscillations of said oscillating member are provided by piezoelectric elements mounted to one of said anchor members.

13. The oscillating torsional hinged device of claim 1 wherein said device is a mirror.

14. The oscillating torsional hinged device of claim 2 wherein said support structure defines a cavity below said enlarged mounting area to allow oscillation of said enlarged area and said mounted permanent magnet.

15. The oscillating torsional hinged device of claim 1 wherein said reduced area connecting said central portion and said support portion is formed by a trench completely through the material of said anchor member.

16. The oscillating torsional hinged device of claim 1 wherein said reduced area connecting said central portion and said support portion comprises a pair of thinned areas defined in at least one of said anchor members on each side of said hinge.

17. The oscillating torsional hinged device of claim 1 wherein said oscillating member is a multilayered structure.

18. An oscillating torsional hinged device comprising:
a pair of torsional hinges, each hinge of said pair of torsional hinges extending along a pivot axis from a first end to a second end;
an oscillating member located between said torsional hinges and connected to said first end of each of said torsional hinges;
first and second anchor members each comprising a support portion suitable for mounting to a support structure connected to a central portion by a reduced connecting area, said central portion connected to said second end of said torsional hinge; and
first and second enlarged mounting areas lying along said pivot axis and connected one each to said central portion of said first and second anchor members opposite said connection to said torsional hinge, said enlarged mounting areas separated from said anchor member by a trench defined between said enlarged mounting area and said anchor member.

19. An oscillating torsional hinged device comprising:
a pair of torsional hinges, each hinge of said pair of torsional hinges extending along a pivot axis from a first end to a second end;
an oscillating member located between said torsional hinges and connected to said first end of each of said torsional hinges;
first and second anchor members each comprising a support portion mounted to a support structure, a central portion lying along said pivot axis and areas having a reduced thickness connecting said support portion to said central portion, said central portion connected to said second end of said torsional hinge; and
first and second enlarged mounting areas lying along said pivot axis and connected one each to said central portion of said first and second anchor members opposite said connection to said torsional hinge.

* * * * *